United States Patent Office 3,206,000
Patented Sept. 14, 1965

3,206,000
ARTICLE POSITIONING APPARATUS
Amherst Carleton Haliday Macartney, also known as Carl Macartney, Hatfield, Pa., assignor to Merck & Co., Inc., Rahway, N.J., a corporation of New Jersey
Filed Apr. 26, 1963, Ser. No. 276,002
12 Claims. (Cl. 198—33)

This invention relates generally to orienting devices and particularly to apparatus for upending articles having cylindrical bodies.

Such apparatus is useful, for example, in connection with machinery for automatically filling, labeling or packaging bottles where it is necessary that each bottle be in an upright position to make filling, labeling or packaging possible. This problem is encountered where bottles are relatively small and are delivered in a haphazard relation, for example from a tote box, to the conveyor supplying the filling, labeling or packaging machine, there being no assurance that the bottles are fed base first onto the conveyor.

A principal object of the invention is to provide apparatus which is particularly adapted for orienting small bottles and the like, simple and economical in construction and practical and reliable in operation.

Another object is to provide such apparatus which when arranged for handling bottles of one size may be conveniently and quickly changed over for handling bottles of an appreciably different size.

Another object is to provide such apparatus which has a relatively high rate of production.

Another object is to provide such apparatus with an upending station and means for automatically recirculating bottles when they are not upended as they pass through said station.

Other objects of the invention will become apparent when the following specification is read with reference to the accompanying drawings, in which.

Figure 1:
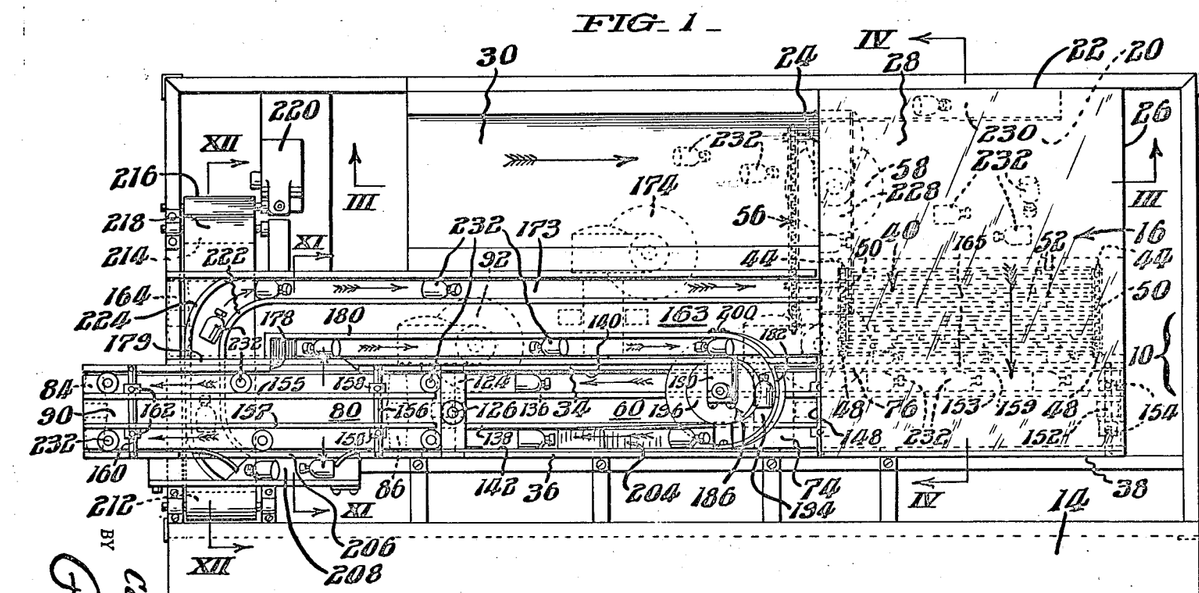
FIGURE 1 is a plan view of apparatus constructed in accordance with the invention.
Figure 2:
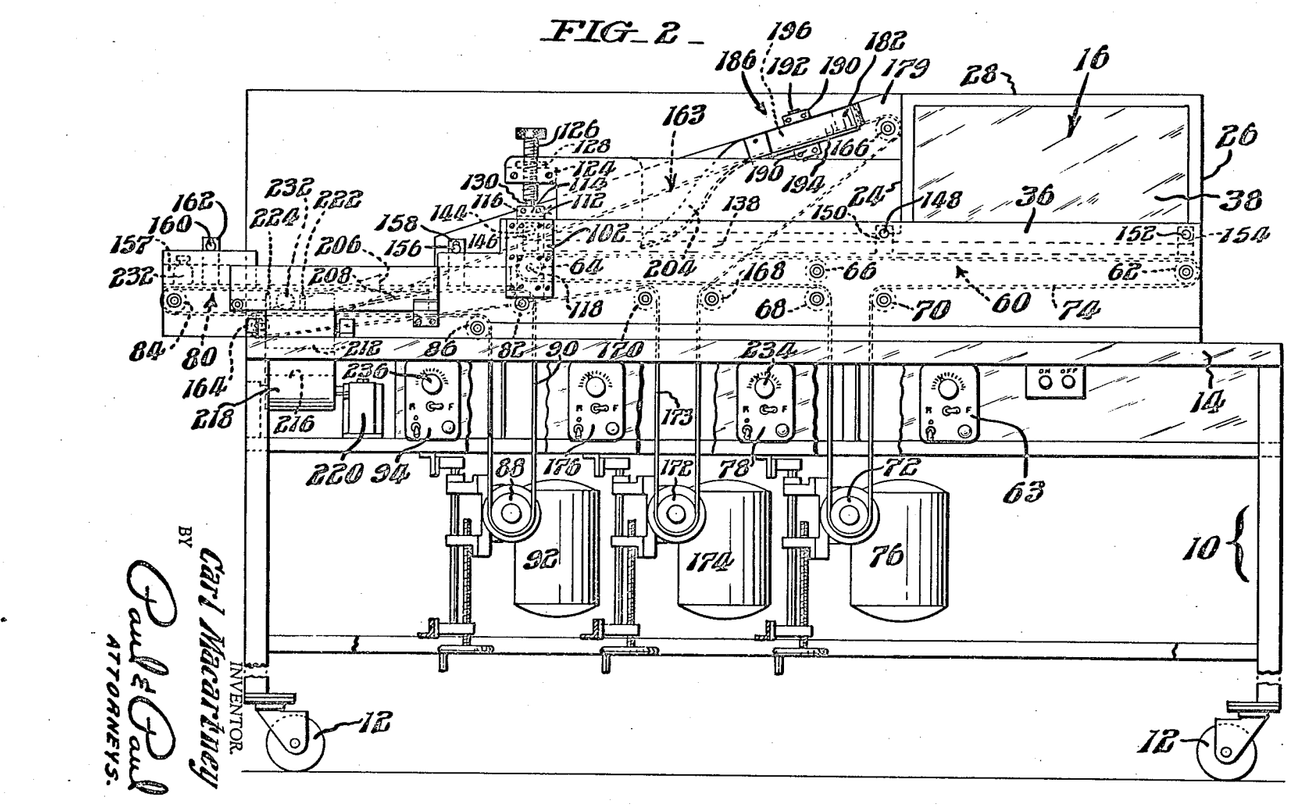
FIGURE 2 is a front elevation of the apparatus shown in FIGURE 1.

Referring particularly to FIGURES 1 and 2, apparatus constructed in accordance with the invention comprises a suitable rigid frame 10 supported on floor engaging casters 12. Extending horizontally across the front of the frame 10 is an apron 14 disposed at a suitable working height above the floor.

Referring particularly to FIGURES 1 to 5 and 13 mounted upon the frame 10 is a hopper, generally designated 16, provided with a bottom wall including a rearwardly and downwardly sloping section 18 and a rearwardly and upwardly sloping section 20. At the rear of the hopper is an upright wall 22, and at opposite ends thereof are upright walls 24 and 26. Carried by the walls 22, 24 and 26 is a horizontally extending top wall 28 preferably made of transparent material.

Figure 3:
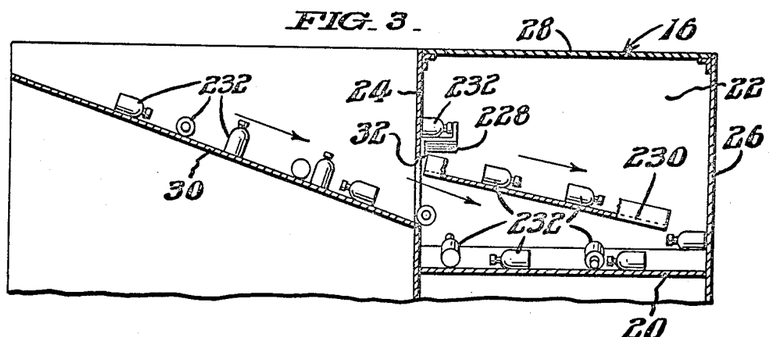
FIGURES 3 and 4 are sections on lines III—III and IV—IV in FIGURE 1.
Figure 4:
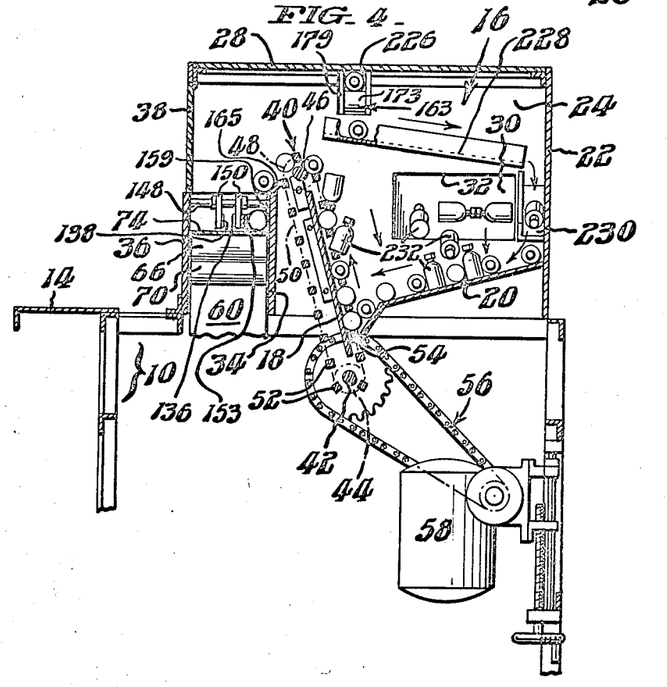

Referring particularly to FIGURES 1, 3 and 4, to the left of the hopper 16 (as viewed in FIGURES 1 and 3) is an open top chute 30 which discharges into the hopper through an opening 32 in the wall 24 of the hopper.

Referring particularly to FIGURES 1, 2, 4, 5 and 13, extending horizontally along the front of the frame 10 are a pair of upright laterally spaced plate stringers 34 and 36. Above the stringer 36 is the upright front wall of the hopper, designated 38, preferably made of transparent material.

Figure 5:
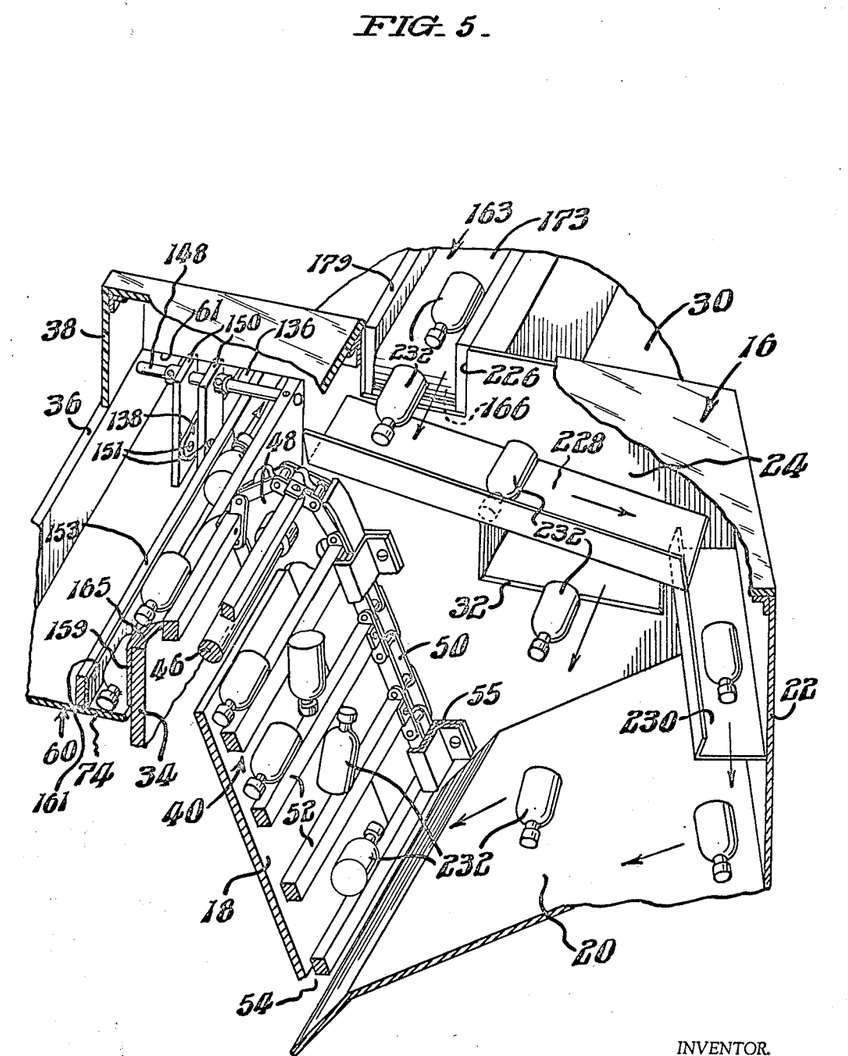
FIGURE 5 is a perspective view showing in transverse section the interior at the loading end of the apparatus.

Referring particularly to FIGURES 1, 4 and 5, associated with the hopper 10 is an inclined conveyor, generally designated 40, comprising a horizontally extending foot shaft 42 mounting a pair of axially spaced chain sprockets 44, a horizontally extending head shaft 46 mounting a pair of axially spaced chain sprockets 48 and a pair of chain belts 50 each trained over a sprocket 44 and a sprocket 48. Extending horizontally between the chain belts 50 are bars 52. The chain belts 50 embrace the bottom section 18 of the hopper and with the bars 52 are adapted to pass freely through a gap 54 between the bottom sections 18 and 20 of the hopper. For controlling the chain belts, suitable guides 55 are provided. The conveyor 40 is actuated by a chain belt drive, generally designated 56, which in turn is actuated by a vertically adjustable electric motor and change speed unit 58 for which controls are provided at 63.

A first horizontal conveyor, generally designated 60, extends across the front of the frame 10, between the plate stringers 34 and 36 and through an opening 61 in the wall 24 of the hopper, from the right-hand toward the left-hand end of the apparatus. The conveyor 60 comprises horizontally extending opposite end rollers 62 and 64, intermediate roller 66, return run rollers 68 and 70 and drive roller 72. Trained over the rollers 62, 64, 66, 68, 70 and 72 is an endless belt 74. The drive roller 72 is actuated by a vertically adjustable electric motor and change speed unit 76 for which controls are provided at 78.

A second horizontal conveyor, generally designated 80, extends across the front of the frame 10, between the plate stringers 34 and 36, from the conveyor 60 to the left-hand end of the apparatus. The conveyor 80 comprises horizontally extending opposite end rollers 82 and 84, return run roller 86 and 88 is an endless belt 90. The drive roller 88 is actuated by a vertically adjustable electric motor and change speed unit 92 for which controls are provided at 94. The container supporting surface of the belt 90 is crowned, as shown, i.e., slopes laterally downwardly in opposite directions. For this purpose, the rollers 82 and 84 are provided with opposite end portions which are tapered, as at 96 and 98. In addition, a deck plate 95 carried by stringers 34 and 36 is provided. The plate 95 is flat but it carries a crown and plate 97 which underlies the working run of the belt 90.

Figure 6:
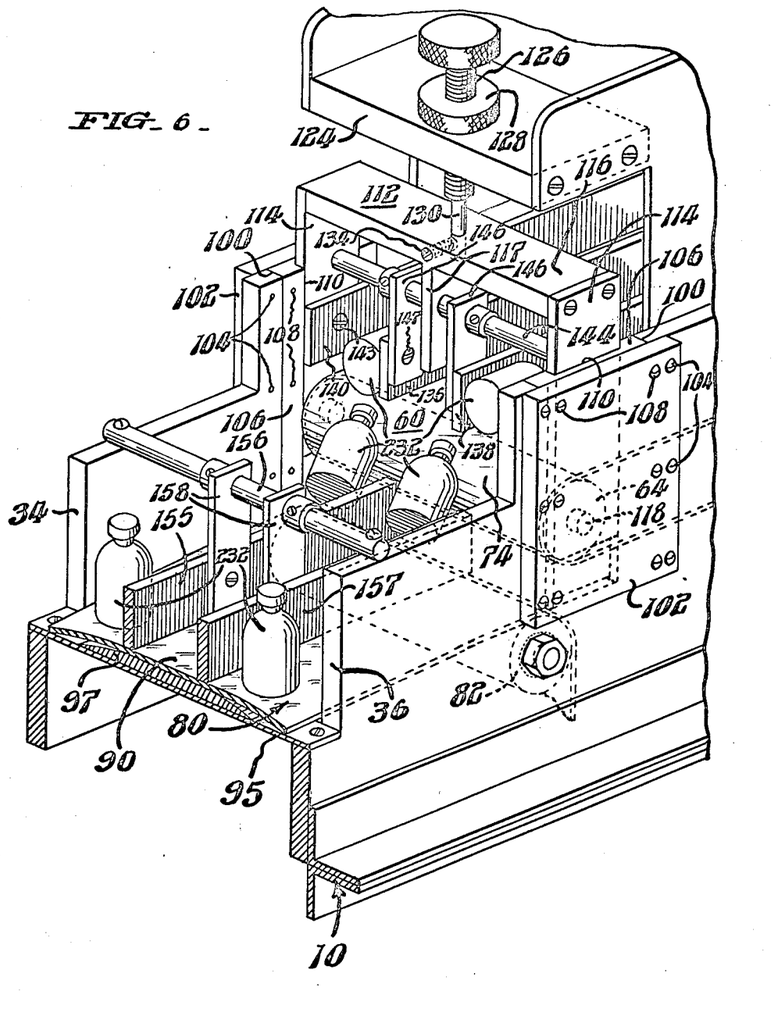
FIGURE 6 is a perspective view at the upending station.
Figure 7:
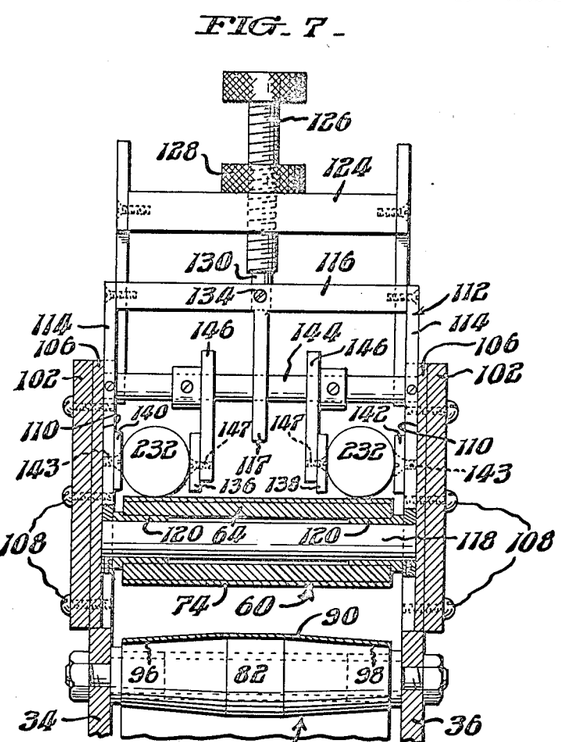
FIGURE 7 is a transverse section at the upending station.

Referring particularly to FIGURES 2, 6 and 7, corresponding portions of the plate stringers 34 and 36 are recessed, as at 100, and overlying each recess is a plate 102 affixed to the plate stringer by screws 104. Fitted into each recess 100 is a shoe plate 106 affixed to the plate 102 by screws 108. The shoes 106 are provided with vertically extending grooves 110, which slidably receive the legs of a yoke, generally designated 112. These yoke legs, designated 114, are connected together by means of a horizontally extending yoke part 116 from which there depends a third yoke leg 117 located intermediate the yoke legs 114. Carried by the yoke 112 is a horizontally extending shaft 118 having opposite end portions affixed respectively to the yoke legs 114. Fitted over the shaft 118 are a pair of axially spaced bushings 120, and carried by the bushings 120 is the roller 64. Overlying the yoke 112 is a cross bar 124 carried by the plate stringers 34 and 36. Threaded through the bar 124 is a screw 126 fitted with a lock nut 128. Screw 126 is provided with a lower end portion 130 reduced in diameter and provided with a circumferentially extending groove (not shown) which receives one end portion of a screw 134 threaded through the yoke part 116.

Referring particularly to FIGURES 1, 2, 5 to 7 and 13, the discharge end of conveyor 60 is provided with longitudinally laterally spaced guide bars 136, 138, 140 and 142. Corresponding ends of the bars 140 and 142 are pivoted to the yoke legs 114, as at 143, and the other end portions are pivoted to the plate stringers 34 and 36, as at 145. At the discharge end of the conveyor is a horizontally extending bar 144 extending freely through the yoke leg 117 and having opposite end portions affixed respectively to the yoke legs 114. Depending from the bar 144 are a pair of hangers 146 to the lower end portions of which are pivoted, as at 147, corresponding end portions of the bars 136 and 138. Intermediate the ends of the conveyor 60 is a horizontally extending bar 148 having opposite end portions affixed respectively to the plate stringers 34 and 36. Depending from the bar 148 are a pair of hangers 150 to the lower end portions of which are pivoted, as at 151, the other end portions of the bars 136 and 138. At the loading end of the conveyor 60 is a horizontally extending bar 152 having opposite end portions affixed respectively to the plate stringers 34 and 36. Depending from the bar 152 is a hanger 154 to the lower end portion of which is connected one end portion of a guide bar 153. The other end portion of the bar 153 is connected to one of the hangers 150. One side of the bar 153 is lined with a strip of Teflon 161. Opposite the bar 153 and strip 161 is a guide plate 159 longitudinally aligned with the guide bar 140 and provided with a longitudinally extending lip 165 curved and feathered as shown.

Referring particularly to FIGURES 1, 2 and 6, the conveyor 80 is provided with a pair of longitudinally extending laterally spaced guide bars 155 and 157. At the loading end of the conveyor 80 is a horizontally extending bar 156, opposite end portions of which are affixed to the plate stringers 34 and 36. Depending from the bar 156 are a pair of hangers 158 to which are connected corresponding end portions of the bars 155 and 157. At the discharge end of the conveyor 80 is a horizontally extending bar 160 opposite end portions of which are affixed to the plate stringers 34 and 36. Depending from the bar 160 are a pair of hangers 162 to which are connected the other end portions of the bars 155 and 157.

Referring particularly to FIGURES 1, 2 and 10 to 13, to the rear of the conveyors 60 and 80 is an inclined conveyor, generally designated 163, including horizontally extending foot and head rollers 164 and 166, return run rollers 168 and 170 and drive roller 172. Trained over the rollers 164, 166, 168, 170 and 172 is an endless belt 173. The drive roller 172 is actuated by a vertically adjustable electric motor and change speed unit 174 for which controls are provided at 176.

Figure 10:
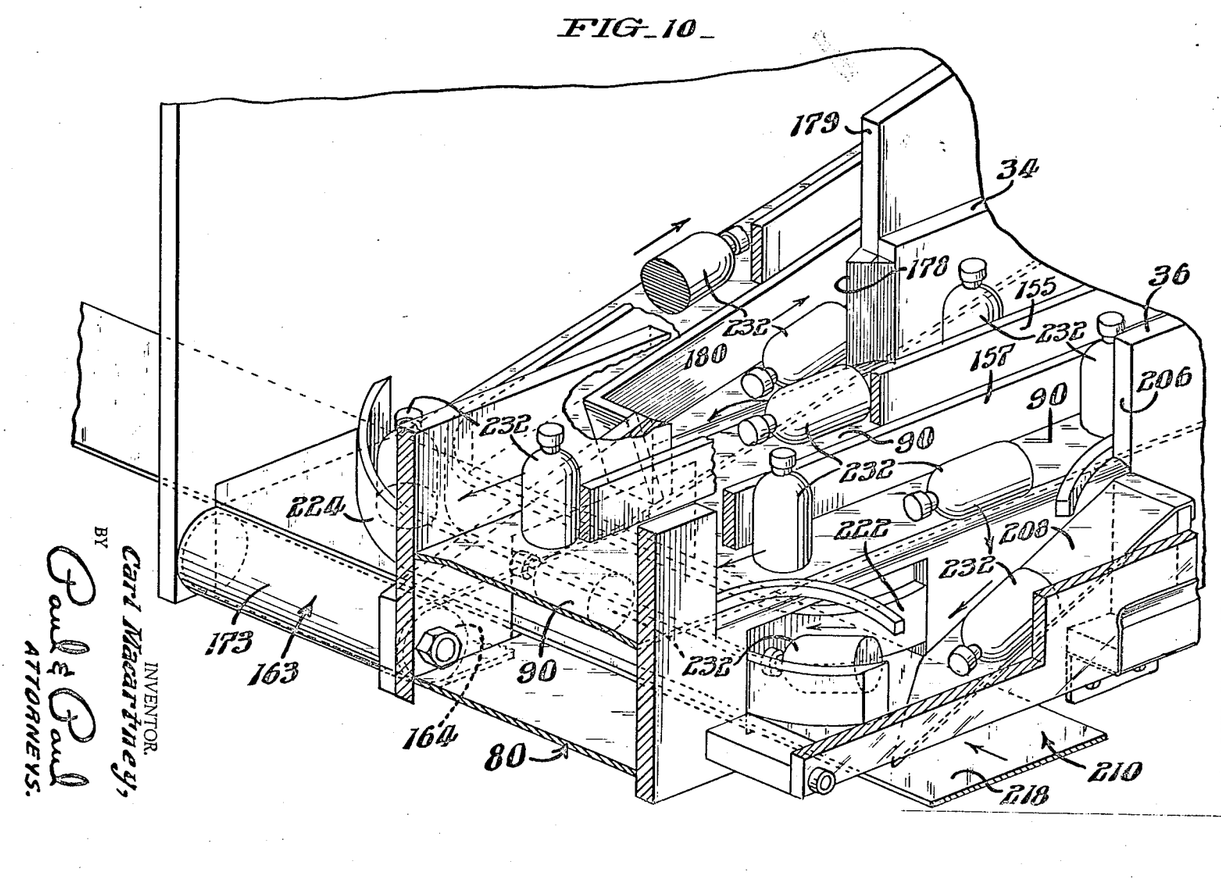
FIGURE 10 is a perspective view at the discharge end of the apparatus.
Figure 11:
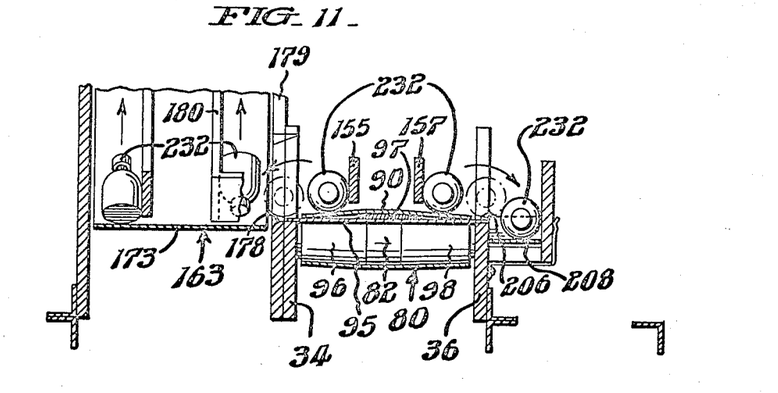
FIGURES 11 and 12 are sections on lines XI—XI and XII—XII in FIGURE 1.
Figure 12:
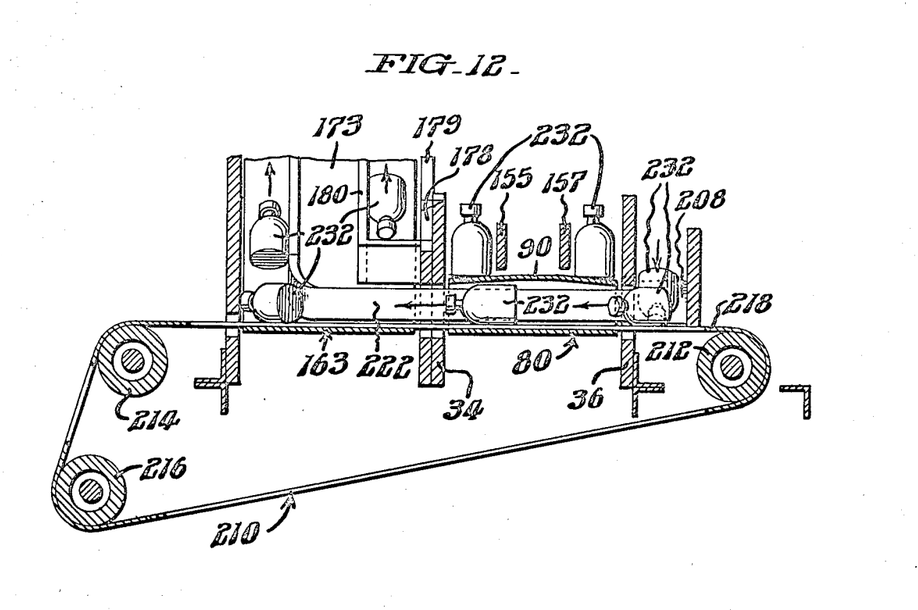
Figures 13, 14, 15:
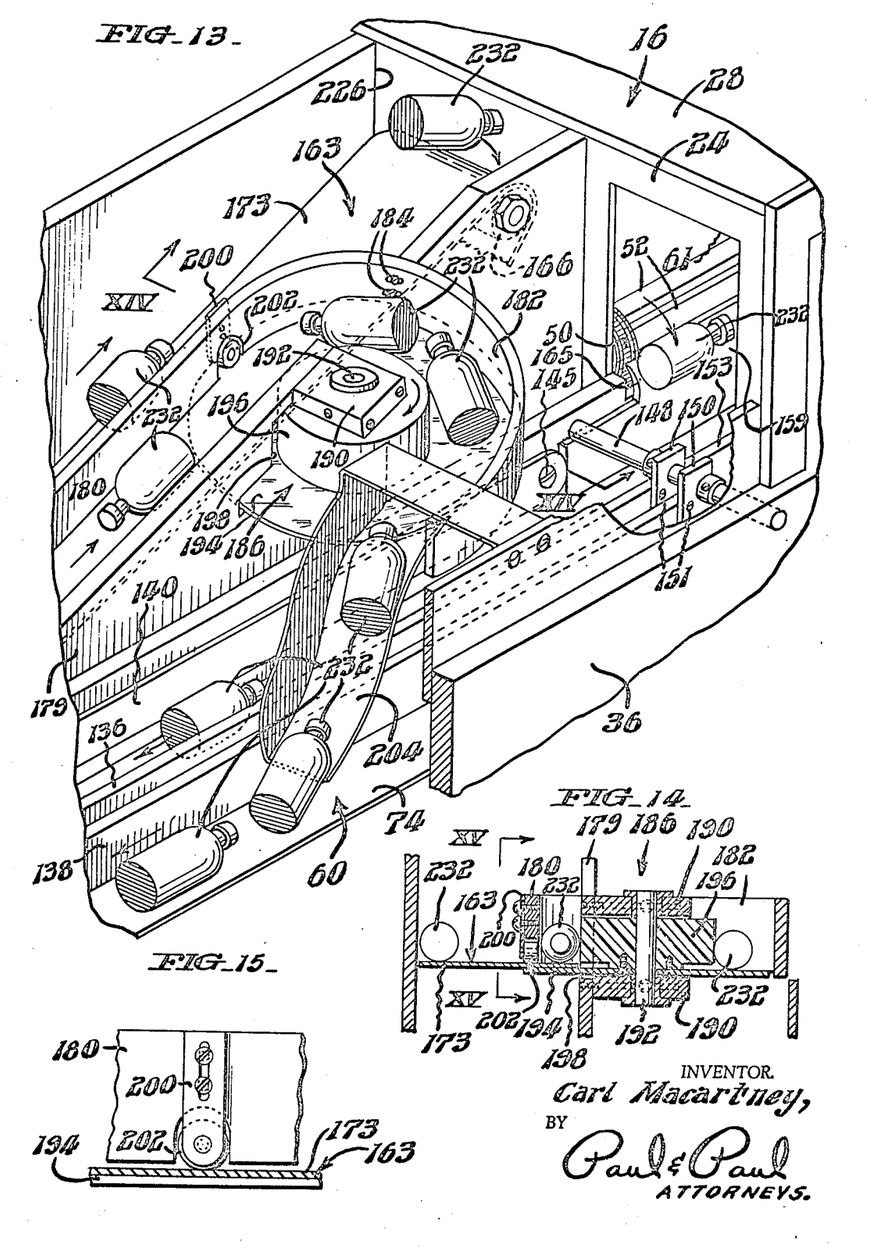
FIGURE 13 is a perspective view showing the container recirculating means.
FIGURE 14 is a section on line XIV—XIV in FIGURE 13.
FIGURE 15 is an enlarged section on line XV—XV in FIGURE 14.

Referring particularly to FIGURES 1, 10 and 13, for the conveyor 80 there is provided in the plate stringer 34 a discharge opening 178 and extending along a side 179 of the conveyor 163 is a guide bar 180, the upper end portion of which is curved, as at 182, and secured, as by screws 184, to the upright side plate 179.

Referring particularly to FIGURES 1, 2 and 13 to 15, at the upper end of the inclined conveyor 163 is a turntable, generally designated 186. This turntable comprises a pair of bearing blocks 190 affixed to the side plate 179, a pin 192 extending between the blocks 190 and affixed thereto and a circular plate 194 affixed to a hub 196 made of Plexiglas. The plate 194 and the hub 196 extend freely through a recess 198 in the plate 179, and the plate 194 extends under the belt 173 of the inclined conveyor 163 in contact therewith. Mounted upon the guide 180 is a vertically adjustable bracket 200, the lower end portion of which mounts a roller 202 adapted to bear upon the belt 173 and hold it in contact with the upper surface of the plate 194. Diametrically opposite the roller 202 is a chute 204 carried by the stringer 36 and directed downwardly to the underlying conveyor 60.

Referring particularly to FIGURES 1, 2, 5 and 10 to 12, for the conveyor 60 there is provided in the plate stringer 36 a discharge opening 206. Associated with the discharge opening 206 is a chute 208 directed downwardly to a cross conveyor, generally designated 210. The conveyor 210 comprises horizontally extending opposite end rollers 212 and 214 and drive roller 216. Trained over the rollers 212, 214 and 216 is an endless belt 218. The drive roller 216 is actuated by an electric motor and change speed unit 220 for which suitable controls (not shown) are provided. Overlying the conveyor 210 are laterally spaced guide bars 222 and 224. The guide bar 222 is provided with an extension which runs longitudinally of the conveyor 163. At the head of the conveyor 163 is an opening 226 in the side 24 of the hopper.

Referring particularly to FIGURES 3, 4 and 5, the interior of the hopper is provided with an inclined chute 228 mounted upon the wall 24 of the hopper and an inclined chute 230 mounted upon the wall 22 of the hopper.

The controls for each of the several conveyors include means which may be adjusted to selectively vary the operating speed of the conveyor. For example, controls 78 and 94 include rheostats respectively controlled by manipulating knobs 234 and 236.

In the operation of the apparatus, full or empty containers, designated 232, may be emptied from tote boxes into the chute 30. They pass downwardly at random into the hopper 16 through the opening 32 in the wall 24 of the hopper, are deposited on the section 20 of the hopper bottom, and roll downwardly to the section 18 of the hopper bottom. The electric motor and change speed unit 58 actuates chain belt drive 56, which in turn drives the conveyor 40. The bars 52 pick up containers 232 and push them upwardly over the plate 18 to the head of the conveyor, where they are gravity-discharged over the lip 165 and deposited between plate 159 and the Teflon strip 161, carried by the bar 153, in a first line of containers. In this first line, the containers are disposed on their sides and at random, with either end trailing, upright or even leaning upon one another.

Figures 8, 9:
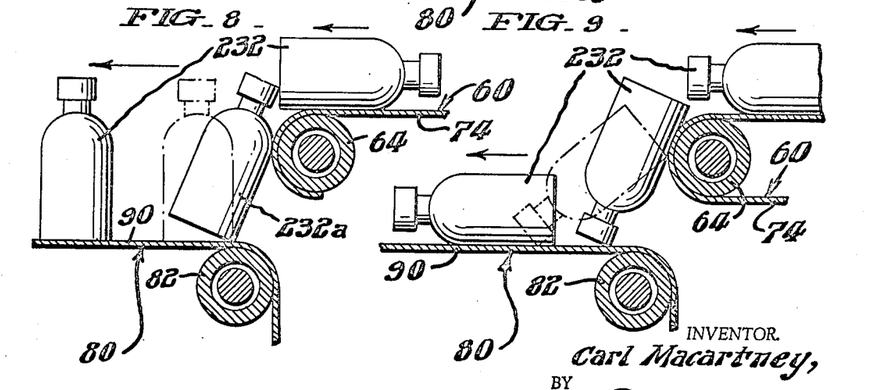
FIGURES 8 and 9 are views showing diagrammatically how the containers are upended.

Conveyor 60 is actuated by electric motor and change speed unit 76, and the containers 232 are carried by the belt 74 to the left, as the apparatus is viewed in FIGS. 1, 2, 6, 8, 9, 10, 13, 16 and 17. The Teflon strip 161 reduces noise and is slippery enough to permit free forward movement of the containers. Referring particularly to FIGURES 8 and 9, containers moving bottom end first are upended as they move through the upending station, i.e., over the step downwardly from the conveyor 60 to conveyor 80. Those containers 232 moving with their necks first remain on their sides. All of the containers 232, whether or not upended, are deposited between plate stringer 34 and guide bar 155.

Conveyor 80 is actuated by electric motor and change speed unit 92, and all of the containers 232 delivered by the conveyor 60 to the conveyor 80 are moved to the left between plate stringer 34 and guide bar 155. Those that have been upended pass to the end of the conveyor 80 for discharge from the apparatus, and those still on their sides roll laterally off the belt 90 and through discharge opening 178 onto conveyor 163, being disposed between side plate 179 and guide bar 180.

Conveyor 163 is actuated by electric motor and change speed unit 174 and carries the containers 232 bottom end first upwardly to the turntable 186, where they are discharged onto the turntable and carried around to chute 204, which directs them downwardly to conveyor 60 and deposits them bottom end first between plate stringer 36 and guide bar 138 in a second line of containers. In this second line, the containers are disposed on their sides with their bottom ends leading. The containers are carried by the belt 74 to the left where they again move through the upending station, i.e., over the step downwardly from the conveyor 60 to the conveyor 80. Most of the containers 232 are upended, but whether or not upended, they are deposited between the plate stringer 36 and the guide bar 157. The containers that are not upended are discharged from the conveyor 80 through discharge opening 206. They pass down chute 208, enter between guide bars 222 and 224 and are then carried by conveyor 210 rearwardly to conveyor 163. Conveyor 163 moves the containers upwardly and deposits them, through opening 226 in the hopper wall 24, upon chute 228 in the hopper. The containers then move down chute 228 to chute 230 and then down onto the hopper bottom section 20.

Referring particularly to FIGURE 8, container 232a has just passed through the upending station, i.e., has just moved over the step downwardly from the conveyor 60 to the conveyor 80, and the lower corner of the container has just engaged the conveyor 80. The conveyor 60 has little, if any, influence upon the container from this point on, but the operating speed of the conveyor 80 is important. In the full line tilted position of the container 232a, the center of gravity of the container, and its contents, if any, must be to the left of the corner of the container resting upon the conveyor 80, and the operating speed of the conveyor 80 must be sufficiently low to avoid changing this relationship. Thus as the container is moved away from the conveyor 60, it rights itself, i.e., it assumes the broken line position shown.

Referring particularly to FIGURES 8 and 9, an important and advantageous feature of this invention consists in providing means for varying the height of the step downwardly from conveyor 60 to conveyor 80. The extent of such variation depends upon many factors, including the height and shape of the bottle, the relative speed of the conveyors, the nature of the contents of the bottles, if any, the extent to which the bottles are filled, and many other factors. To accomplish this delicate adjustment accurately, the roller 64 is adjusted vertically relative to the roller 82 by manipulating the screw 126 to adjust the vertical position of the yoke 112.

It will also be appreciated that the guide bars 136, 138 and 153, over the conveyor 60 and the guide bars 155, 157 over the conveyor 80 are laterally adjustable to accommodate containers of various sizes in transverse section.

Figure 16:
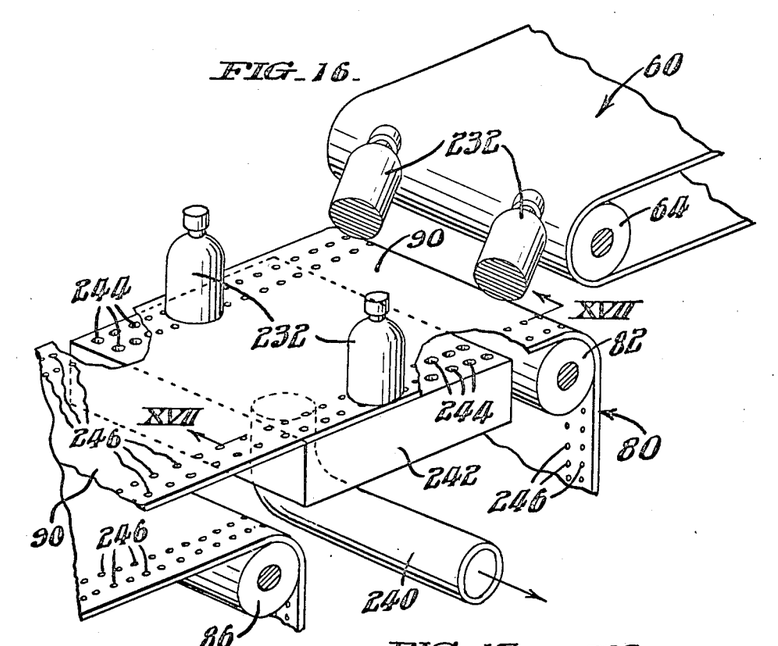
FIGURE 16 is a perspective view at the upend station, showing a modified construction.
Figure 17:
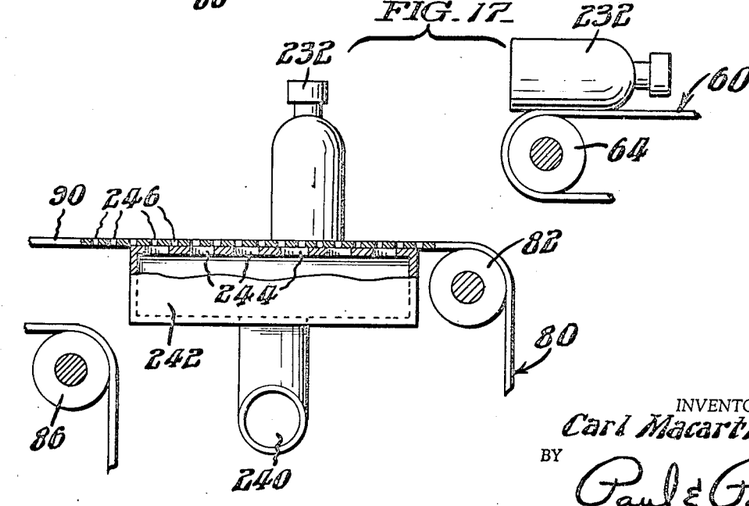
FIGURE 17 is a section on line XVII—XVII in FIGURE 16.

The apparatus may be modified to advantage as illustrated in FIGURES 16 and 17, where a conduit 240 is shown connected to the underside of a shallow rectangular hollow box 242 disposed between the rollers 82 and 86 and underlying the working run of the conveyor belt 90. Connected to the conduit 240 is a turbine (not shown) which operates to pull a vacuum in the box 242. The top wall of the box 242 is provided with rows of holes 244 in opposite side marginal portions thereof, and the belt 90 is provided with rows of holes 246 in opposite side marginal portions thereof, the arrangement being such that as the working run of the belt 90 moves over the box 242, each row of holes 246 in the belt 90 passes over a row of holes 244. Thus whenever a hole 246 in the belt 90 registers with a hole 244 in the top wall of the box 242, air is drawn through the registering holes into the box 242. Containers 232 discharged from the conveyor 60 onto the conveyor 80 are deposited over the openings 246 in the belt 90, and the suction acting on the bottoms of the containers aids materially in the upending operation.

It will be understood, of course, that the present invention, as described and shown, is susceptible to various changes and modifications which may be made without any departure from the general principles or real spirit of the invention. Accordingly, it is intended to claim the present invention broadly, as well as specifically, as indicated in the appended claims.

What is claimed is:

1. Apparatus for sorting out elongated articles having rounded bodies and each having a base upon which normally it can stand and a top upon which normally it cannot stand and for delivering such articles in an upright position the combination comprising conveyor means including a first section and a second section, the effective conveying levels of said conveyor sections being different whereby to provide a step from said first conveyor section downwardly to said second conveyor section, said second conveyor section being disposed to receive said articles disposed on their sides and at random with either end trailing and gravity discharged from sad first conveyor section over said step, and a portion of said second conveyor section being transversely inclined for laterally discharging any of said articles that are rollably positioned on said rounded bodies.

2. Apparatus for sorting out elongated articles having rounded bodies and each having a base upon which normally it can stand and a top upon which normally it cannot stand and for delivering all of such articles in an upright position the combination comprising conveyor means including a first section and a second section, the effective conveying levels of said conveyor sections being different whereby to provide a step from said first conveyor downwardly to said second conveyor section, said second conveyor section being disposed to receive said articles disposed on their sides and at random with either end trailing and gravity discharged from said first conveyor section over said step, a portion of said second conveyor section being transversely inclined for laterally discharging any of said articles that are rollably positioned on said rounded bodies, and means for receiving said articles laterally discharged as aforesaid from said second conveyor section and returning them to said first conveyor section for movement once again over said step.

3. Apparatus as defined in claim 2 wherein the second conveyor section includes an endless belt, and means underlying the working run of said belt are operative to support the same and cause it to arch in transverse section.

4. Apparatus for sorting out elongated articles having round bodies and each having a base upon which normally it can stand and a top upon which normally it cannot stand and for delivering all of such articles in an upright position the combination comprising conveyor means including a first section and a second section, the effective conveying levels of said conveyor sections being different whereby to provide a step from said first conveyor section downwardly to said second conveyor section, said second conveyor section being disposed to receive said articles disposed on their sides and at random with either end trailing and gravity discharged from said first conveyor section over said step, a portion of said second conveyor section being inclined on opposite sides thereof for laterally discharging in opposite directions any of said articles that are rollably positioned on said rounded bodies, and means for receiving said articles laterally discharged as aforesaid from said second conveyor section and returning them to said first conveyor section for movement once again over said step.

5. Apparatus for sorting out elongated articles having round bodies and each having a base upon which normally it can stand and a top upon which normally it cannot stand and for delivering all of said articles in an upright position the combination comprising conveyor means including a first section and a second section, the effective conveying levels of said conveyor sections being different whereby to provide a step from said first conveyor section downwardly to said second conveyor section, said second conveyor section being positioned to receive articles disposed in a first line thereof at random with either end trailing and gravity discharged from said first conveyor section over said step, a portion of said second conveyor section being inclined on one side thereof for laterally discharging any of said articles that are rollably positioned on their rounded bodies, means for receiving articles laterally discharged as aforesaid and returning them with bases leading to said first conveyor section, said articles being deposited in a second line thereof for movement again over said step, said portion of the second conveyor section being also inclined on the opposite side thereof for laterally discharging any of the articles in said second line of articles that are rollably positioned on their rounded bodies, and means for receiving said articles laterally discharged from said second line of articles and returning them to said first conveyor section for movement again in said first line of articles.

6. Apparatus as defined in claim 5 wherein the means for returning first line articles to the first conveyor section and placing them in the second line of articles includes a first auxiliary conveyor for reversing the direction of movement of said articles, and means for receiving articles from said first auxiliary conveyor, carrying them transversely of said first conveyor section and placing them in said second line of articles, and the means for returning second line articles to the first conveyor section and replacing them in the first line of articles includes a second auxiliary conveyor for carrying the articles transversely of said second conveyor section to said first auxiliary conveyor.

7. Apparatus as defined in claim 6 wherein the first auxiliary conveyor is operable for elevating the articles, the means for receiving articles from the first auxiliary conveyor includes a turntable, and means for chuting articles from the turntable to the first conveyor section, and the means for returning second line articles to the first conveyor section and replacing them in the first line of articles includes a hopper for receiving articles from the first auxiliary conveyor, and a third auxiliary conveyor for removing articles from the hopper.

8. Apparatus as defined in claim 6 wherein said first and second conveyor sections include guide members interposed between said first and second lines of articles and laterally adjustable for selectively accommodating articles of different sizes, the first auxiliary conveyor is an inclined belt conveyor operable for elevating the articles, and the means for receiving articles from said conveyor includes a turntable frictionally engaged with and actuated by the conveyor belt.

9. A high speed setting-up machine for automatically setting up bottles, vials and like articles of a given height and diameter on their bases and delivering them, in set up condition, onto a substantially horizontal flat surface and being adapted, without substitution of any parts and with only a small number of simple adjustments, to be operable over a wide range of article heights and diameters, said machine comprising: a first substantially horizontally moving belt conveyor onto the top of which the articles are fed while on their side with their longitudinal axes substantially parallel to the direction of travel of said first conveyor but at random as to whether the articles are fed base first or top first onto said first conveyor, said first conveyor having a discharge end roller over which the belt of the conveyor passes and at which point the articles on said first conveyor are discharged longitudinally therefrom; a second substantially horizontally moving belt conveyor positioned so that the articles discharged from the first conveyor are discharged downward onto the top of said second conveyor; a pair of guide bars positioned alongside each of said conveyors to keep the articles in the line on its associated conveyor, at least one of each pair of said guide bars being readily adjustable transversely with respect to its associated conveyor so as to accommodate the conveyor to articles of different diameter; means for controlling the speed of travel of each of said conveyors independently of the speed of the other; means for adjusting the axis of the discharge end roller of the first conveyor vertically with respect to the top surface of the second conveyor and thereby vary the length of fall of the articles as they are discharged from the first conveyor onto the second conveyor, so as to adjust the machine, along with appropriate adjustment of the relative speeds of the conveyors, to handling articles of different height, there being for a given height of fall, which is related to the height of the article, a speed of the second conveyor relative to the speed of the first conveyor at which the articles approaching the end of the first conveyor base first, land base first on the second conveyor and remain erect in this position on the second conveyor, with the remaining articles on the first conveyor, which approach the end of the first conveyor top first, discharged onto the second conveyor top first, which articles thereupon do not remain erect on the second conveyor and so are then carried away on top of the second conveyor while lying on their side with their longitudinal axes substantially parallel to the direction of travel of the second conveyor; and means, including means imparting a relatively small pitch to the belt of the second conveyor transverse to its direction of travel, and also including an opening in the guide bar alongside the second conveyor in the area adjacent the downside of the pitched portion of the second conveyor, for rolling off the second conveyor the articles which are lying on their side, whereby all the articles remaining on the second conveyor are articles which are set up on their bases.

10. A machine as set forth in claim 9 in which the machine includes means for collecting the articles which have rolled off the second conveyor and recycling them onto the first conveyor.

11. A machine as set forth in claim 10 in which the machine includes means for collecting articles which have rolled off the second conveyor after being recycled and recycling them once again.

12. Apparatus for sorting out elongated articles having round bodies and each having a base upon which normally it can stand and a top upon which normally it cannot stand and for delivering all of said articles in an upright position the combination comprising conveyor means including a first section and a second section, the effective conveying levels of said conveyor sections being different whereby to provide a step from said first conveyor section downwardly to said second conveyor section, said second conveyor section including an endless belt having a working run positioned to receive articles disposed in a first line thereof at random with either end trailing and gravity discharged from said first conveyor section over said step, a portion of said second conveyor section being inclined on one side thereof for laterally discharging any of said articles that are rollably positioned on their rounded bodies, means for receiving articles laterally discharged as aforesaid and returning them with bases leading to said first conveyor section, said articles being deposited in a second line thereof for movement again over said step, said portion of the second conveyor section being also inclined on the opposite side thereof for laterally discharging any of the articles in said second line of articles that are rollably positioned on their rounded bodies, means for receiving said articles laterally discharged from said second line of articles and returning them to said first conveyor section for movement again in said first line of articles, and stationary means underlying the loading end of the working run of said belt and operative for sucking air through the overlying ones of openings forming in said belt, said openings being disposed in longitudinally extending areas of said belt respectively underlying said first and second lines of articles.

References Cited by the Examiner

UNITED STATES PATENTS

| | | | |
|---|---|---|---|
| 791,243 | 5/05 | Carlson | 198—30 |
| 1,134,221 | 4/15 | Nilsson | 198—162 X |
| 2,003,668 | 6/35 | Pittenger. | |
| 2,139,796 | 12/38 | Blosser | 198—30 X |
| 2,633,971 | 4/53 | Albertoli | 198—33 |
| 2,719,624 | 10/55 | Fox | 198—33 |
| 2,771,981 | 11/56 | McKune | 198—30 |
| 2,929,490 | 3/60 | Stewart | 198—33 |

FOREIGN PATENTS 412,502  5/34  Great Britain.

SAMUEL F. COLEMAN, *Primary Examiner.*

EDWARD A. SROKA, *Examiner.*